(12) United States Patent
Vogas

(10) Patent No.: US 8,838,058 B2
(45) Date of Patent: Sep. 16, 2014

(54) EXTENDING THE UPPER FREQUENCY LIMIT OF A COMMUNICATIONS RADIO

(75) Inventor: Michael S. Vogas, Morristown, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 270 days.

(21) Appl. No.: 13/465,977

(22) Filed: May 7, 2012

(65) Prior Publication Data

US 2012/0289171 A1   Nov. 15, 2012

Related U.S. Application Data

(60) Provisional application No. 61/484,017, filed on May 9, 2011.

(51) Int. Cl.
*H04B 1/26* (2006.01)
*H04B 1/06* (2006.01)
*H04B 1/40* (2006.01)

(52) U.S. Cl.
CPC ........................................ *H04B 1/40* (2013.01)
USPC .......................... 455/313; 455/314; 455/252.1

(58) Field of Classification Search
CPC ................................. H03D 7/1491; H04B 1/28
USPC ......................... 455/313–316, 252.1, 254–266
See application file for complete search history.

(56) References Cited

U.S. PATENT DOCUMENTS

| | | | | |
|---|---|---|---|---|
| 4,553,105 A | * | 11/1985 | Sasaki | 330/145 |
| 5,568,088 A | * | 10/1996 | Dent et al. | 330/151 |
| 5,909,645 A | * | 6/1999 | Abramsky et al. | 455/249.1 |
| 5,918,166 A | * | 6/1999 | Tsumura | 455/249.1 |
| 6,208,849 B1 | * | 3/2001 | Cho et al. | 455/296 |
| 6,392,715 B1 | * | 5/2002 | Sato et al. | 348/731 |
| 6,549,082 B2 | | 4/2003 | Ipek et al. | |
| 7,313,368 B2 | | 12/2007 | Wu et al. | |
| 7,321,754 B2 | | 1/2008 | Zellwger et al. | |
| 7,911,293 B2 | | 3/2011 | Jansen et al. | |
| 8,089,309 B2 | | 1/2012 | Jansen et al. | |
| 2003/0157964 A1 | * | 8/2003 | Park et al. | 455/558 |
| 2003/0236083 A1 | * | 12/2003 | Wiklund et al. | 455/334 |
| 2004/0253935 A1 | * | 12/2004 | Drentea | 455/314 |
| 2005/0032487 A1 | * | 2/2005 | Montalvo | 455/126 |
| 2011/0156781 A1 | * | 6/2011 | Ecklund et al. | 327/159 |
| 2012/0076224 A1 | | 3/2012 | Schwartz et al. | |

* cited by examiner

*Primary Examiner* — Sonny Trinh
*Assistant Examiner* — Cindy Trandai
(74) *Attorney, Agent, or Firm* — Leo Zucker; Daniel J. Long

(57) ABSTRACT

A communications radio or transceiver having an extended upper operating frequency limit of at least 6 GHz. The radio includes a first IF conversion stage for receiving and downconverting a RF input signal to a first IF signal, and a second IF conversion stage for downconverting the first IF signal to a second IF signal. The first and the second conversion stages each have adjustable first and second attenuators, a serial peripheral interface (SPI) for controlling the attenuators in response to command words, a mixer coupled to an output of the second attenuator, and a buffer for applying a local oscillator (LO) signal to an input of the mixer. Each conversion stage is in the form of an integrated circuit chip. Component devices of each chip and electrical connections between the components, are dimensioned so that the chip has a 6 GHz upper frequency limit.

8 Claims, 4 Drawing Sheets

EXTENDING THE UPPER FREQUENCY LIMIT OF A COMMUNICATIONS RADIO

CROSS REFERENCE TO RELATED APPLICATION

This application claims priority under 35 U.S.C. Sec. 119 (e) of U.S. Provisional Patent Application No. 61/484,017 filed May 9, 2011, titled Method of Using Core Engine to Extend Radio System Frequency, and incorporated herein by reference in its entirety.

BACKGROUND OF THE INVENTION

1. Field of the Invention

The present invention relates to radio communications systems, and more particularly to extending the upper frequency limit of communications radios or transceivers.

2. Discussion of the Known Art

Typically, radio frequency (RF) transceivers constructed for use in the Joint Tactical Radio System (JTRS) have an upper operating frequency limit of about 2 GHz. This limit is not sufficient to support new and emerging wideband networking waveforms such as, e.g., Communication Data Link (CDL) and IEEE 802.16 WiMAX, however. Such waveforms may require the upper frequency limit of a transceiver to be extended to as high as 6 GHz.

U.S. Pat. No. 6,549,082 (Apr. 15, 2003) describes a high frequency oscillator. A reference oscillator in the form of a digital controlled frequency synthesizer with an external tank circuit, operates in a range of 1.25 to 1.5 GHz. A phase-locked loop circuit of the synthesizer is combined with the reference oscillator in an integrated circuit, preferably using a Bipolar CMOS (BiCMOS) silicon/germanium process. According to the patent, a tuned output range of 5 to 6 GHz may be provided by using a dividing factor of four.

U.S. Pat. No. 7,313,368 (Dec. 25, 2007) discloses a transceiver architecture including a dual-band, single frequency synthesizer for wireless communication in the 2.4 GHz and 5 GHz International industrial, scientific, and medical (ISM) bands. A high frequency integrated circuit down converts a received multi-mode frequency signal, and a base frequency decoding circuit performs the processes of up-sampling and emitting a signal so as to transmit/receive a dual band signal by using the single frequency synthesizer.

Notwithstanding the above, there is a need to extend the upper frequency limit of existing tactical radio systems or transceivers from 2 GHz to 6 GHz so that the systems can support the new and emerging wideband networking waveforms transmitted above 2 GHz in the RF spectrum, while confining the space occupied by the extended systems within an even smaller volume than that allotted for the existing systems.

SUMMARY OF THE INVENTION

According to the invention, a communications radio or transceiver having an extended upper operating frequency limit, includes a first intermediate frequency (IF) conversion stage constructed and arranged for receiving and down converting a radio frequency (RF) input signal to a first IF signal, and a second IF conversion stage constructed and arranged for down converting the first IF signal to a second IF signal.

The first and the second conversion stages each have adjustable first and second attenuators, a serial peripheral interface (SPI) for controlling the attenuators in response to command words, a mixer coupled to an output of the second attenuator, and a buffer for applying a local oscillator (LO) signal to an input of the mixer. Each conversion stage is in the form of an integrated circuit chip. Component devices of each chip and electrical connections between the components, are dimensioned so that the chip has an upper frequency limit of at least 6 GHz.

Thus, "System-on-a-chip" and other size reduction techniques are employed to provide a radio having a 6 GHz upper frequency limit, and in a much smaller form factor compared to existing radios. Such techniques include the use of switched and stored circuit paths among receiver and transmitter functions.

For a better understanding of the invention, reference is made to the following description taken in conjunction with the accompanying drawing and the appended claims.

DETAILED DESCRIPTION OF THE INVENTION

Figure 1:
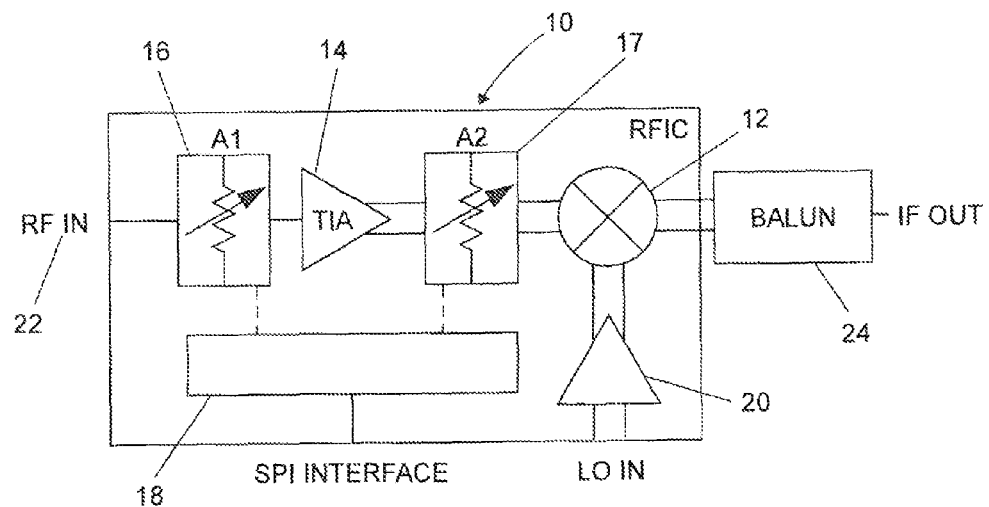
FIG. 1 is a diagram of a radio frequency (RF) converter chip employed in the present invention, showing certain devices integrated in the chip.

FIG. 1 is a functional block diagram of a high dynamic range RF converter chip 10 developed by and available from BAE Systems Microelectronics Group. By integrating RF switches, amplifiers, filters, and mixers on a die with short connections between components to reduce parasitic capacitance and improve high speed electrical performance, the chip 10 has an upper operating frequency limit of 6 GHz.

Figure 2:
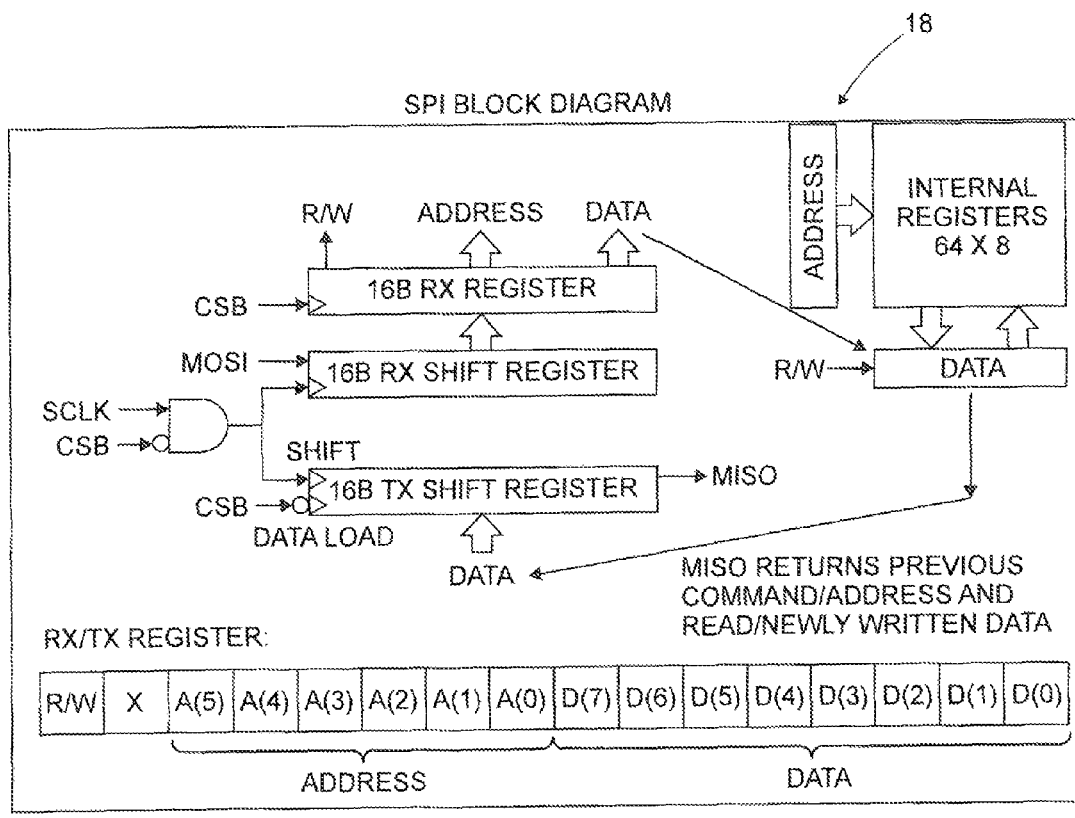
FIG. 2 is a block diagram of a serial peripheral interface (SPI) in the chip of FIG. 1.

Devices integrated on the chip 10 include, inter alia, a Gilbert cell mixer 12 with a transimpedance amplifier (TIA) input stage 14 as disclosed in U.S. Pat. No. 8,089,309 (Jan. 3, 2012), and thermometer coded attenuators 16, 17, as described in U.S. Pat. No. 7,911,293 (Mar. 22, 2011). Both of the mentioned patents are incorporated by reference in their entireties. The attenuators 16, 17, exhibit low phase discontinuity between gain steps and monotonicity is assured. The chip 10 also has a high speed CMOS serial peripheral interface (SPI) 18, shown in detail in FIG. 2, and an integrated local oscillator (LO) buffer 20 that allows the chip 10 to be driven with a very low nominal −15 dBm LO signal level. The attenuators 16, 17 are controlled by the SPI 18.

In addition, switched filters may be integrated into the converter chip 10 for image suppression, so that the filters are also controlled via the SPI 18. Such filters would reduce the amount of attenuation required from externally provided image reject filters, and help to avoid the generation of spurious signals.

High or low side LO frequency signals can be used to down convert a 2 MHz to 6 GHz single ended RF signal 22 that is input to the chip 10, to an optimized intermediate frequency (IF) of up to 1.5 GHz. IF bandwidths from very narrow to more than 100 MHz can be realized by using an appropriately selected off-chip filter. A balun 24 converts a differential IF output signal from the Gilbert cell mixer 12 to a single ended IF signal to interface with the back end of a transceiver, thus maintaining the benefits of the fully balanced mixer 12. Control registers are memory mapped so that a companion second converter chip 10 may be controlled via the common serial interface 18.

Figure 3:
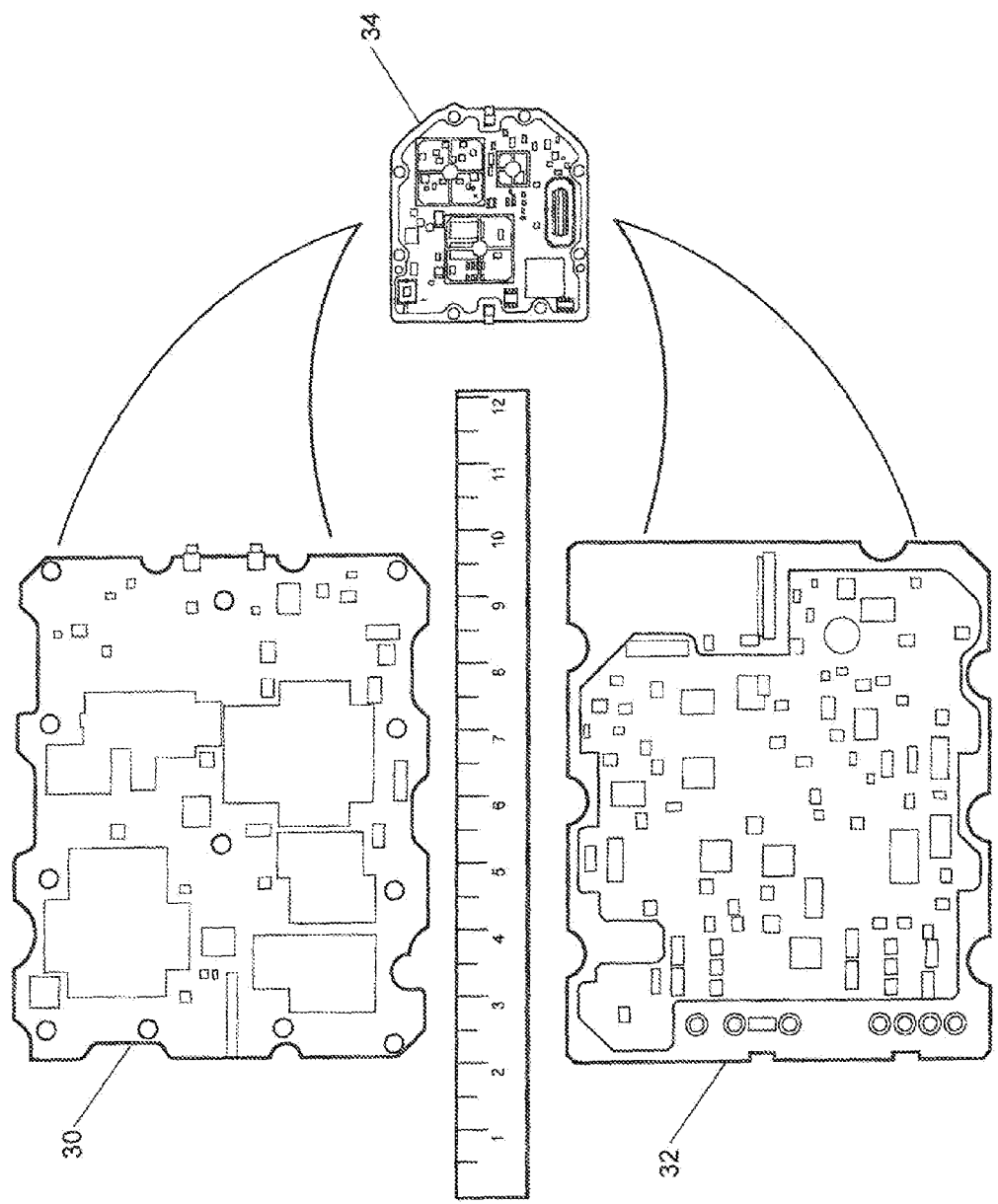
FIG. 3 shows the relative size of a single core engine RF circuit card constructed according to the invention at the right, with respect to a pair of prior RF circuit cards at the left.
Figure 4:
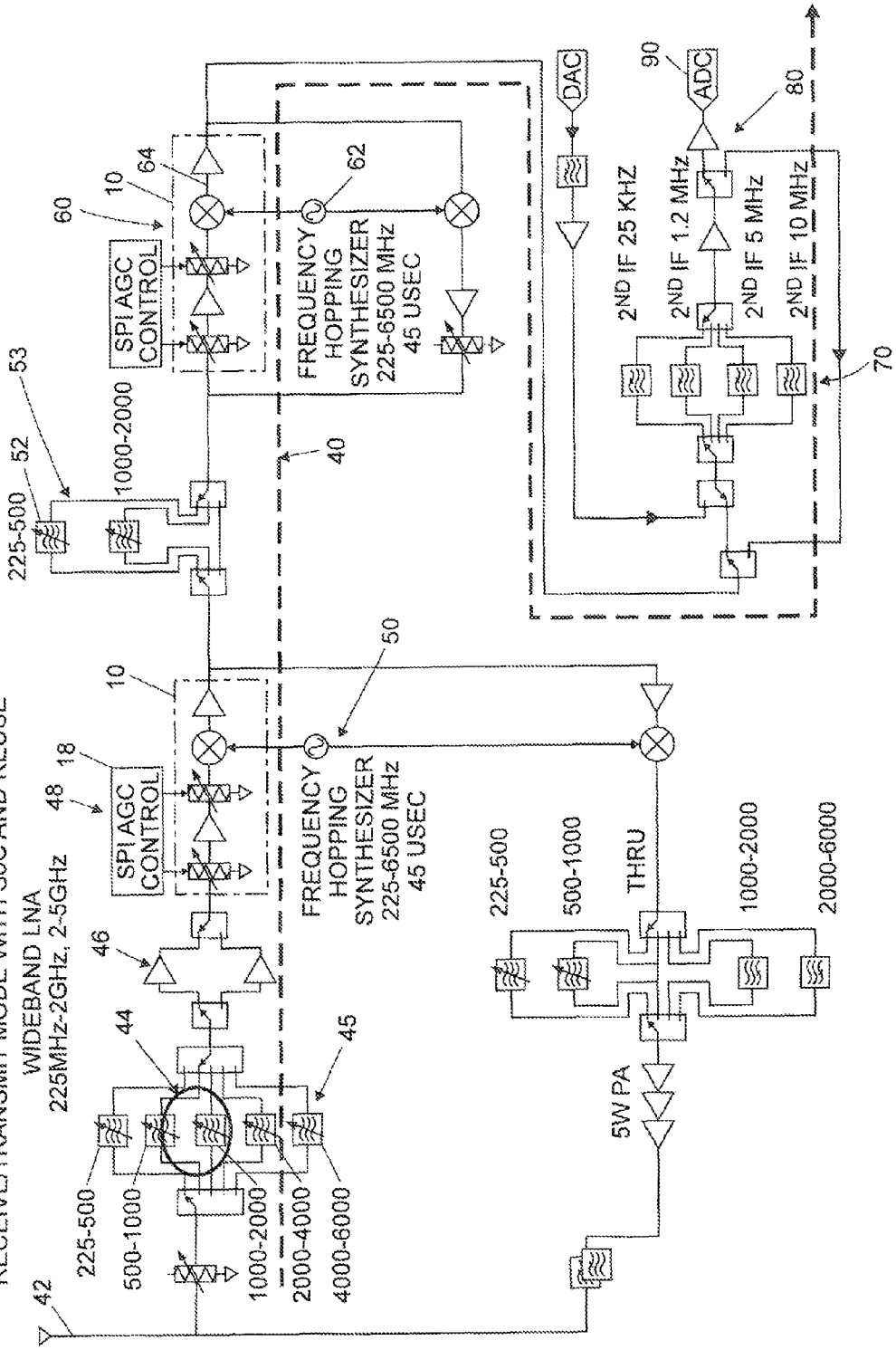
FIG. 4 shows a signal path through the inventive circuit card when tuned to receive a signal at 1.7 GHz.
Figure 5:
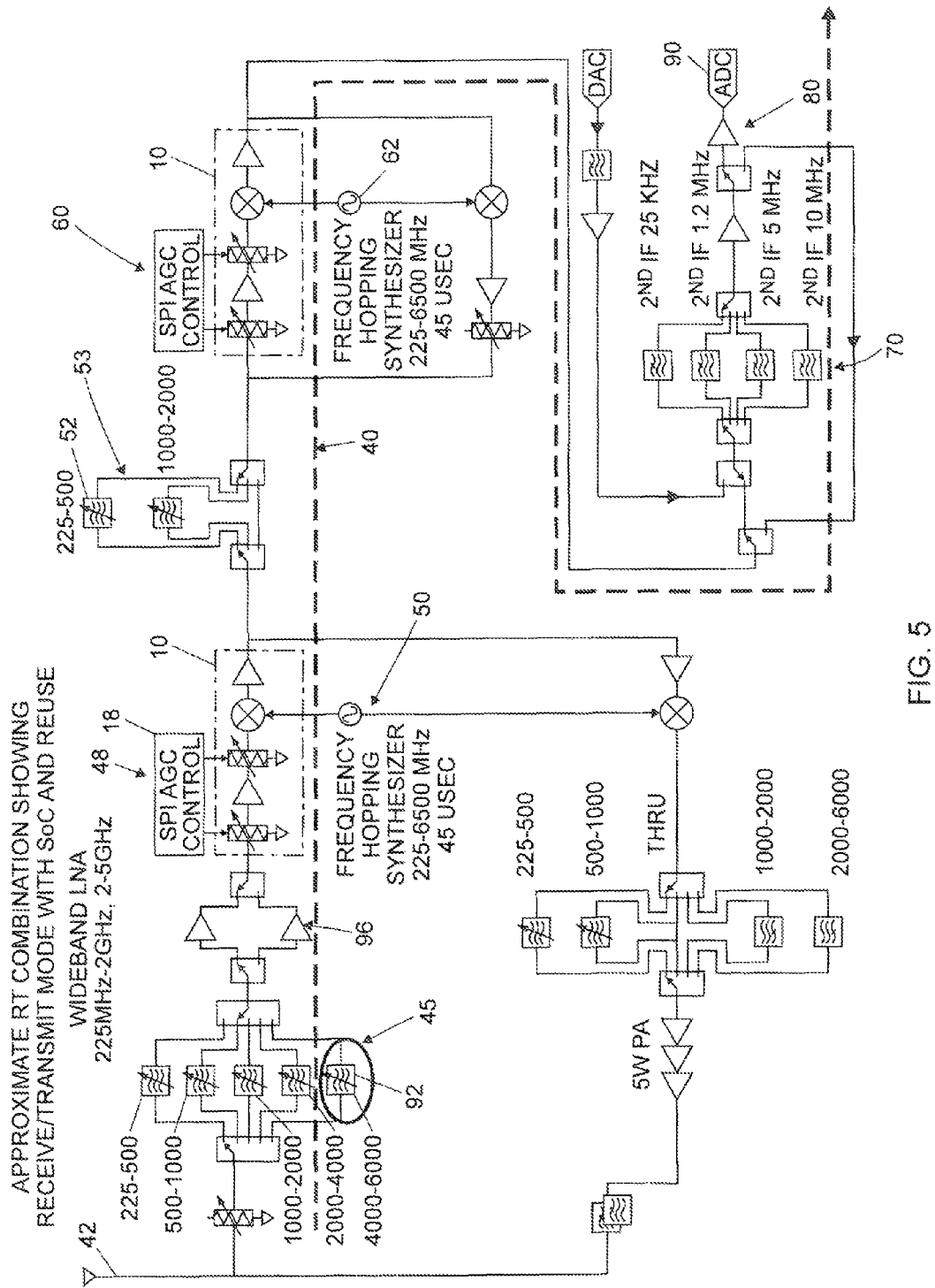
FIG. 5 shows a signal path through the inventive circuit card when tuned to receive a signal at 5.9 GHz.

FIG. 3 shows, at the left, two RF circuit cards 30, 32, that form part of a core engine (CE) of an existing JTRS transceiver having an upper frequency limit of 2 GHz. By contrast, a single RF circuit card 34 constructed according to the present invention at the right of FIG. 3, can replace the functionality of the two cards 30, 32, in a transceiver. By employing two of the converter chips 10 on the card 34 as shown in FIGS. 4 and 5, the size of the card can be made substantially smaller than either one of the cards 30, 32. Moreover, the chips 10 enable the operating frequency range of the transceiver to be extended well beyond the present JTRS limit of 2 GHz.

Advantages of the inventive RF circuit card 34 with respect to the prior cards 30, 32, include:

1. A controlled 30 dB range of attenuation for each of the two attenuators 16, 17, on the converter chip 10, for a total range of controlled attenuation of 60 dB.
2. A minimum attenuator step size of 0.125 dB with +/−0.2 dB accuracy across the 6 GHz range of transceiver operation. See the above mentioned U.S. Pat. No. 7,911,293, incorporated by reference.
3. An input third intercept point (IP3) of +20 dBm.
4. A noise figure of 13 dB or less.
5. Receiver P1 dB out>+5 dBm
6. The SPI interface 18 in each chip 10 enables digital control of all the chip functions.
7. The transimpedance amplifier input stage mixers on each chip 10 provide high linearity. See the above mentioned U.S. Pat. No. 8,089,309, incorporated by reference.
8. Lower power consumption.
9. A lower parts count, and higher integration of components inside each chip 10.
10. Lower LO drive due to the built in buffer amplifier 20 in each chip 10. Lower LO drive means lower power consumption relative to the prior CE in which a drive of +10 dBm was required. Also, less interference and harmonics are generated with the reduced LO drive power.
11. Digital automatic gain control (AGC) in each chip ensures reliable digital control over a 60 dB dynamic range, without external digital-to-analog converters and signal paths leading to discrete components which can produce interference. The thermometer controlled attenuators in each chip 10 ensure proper attenuation at temperature extremes, thus removing or relieving the need for elaborate temperature calibration tables.
12. A high power IF amplifier in the back end of the receiver (Rx) chain reduces the need for a high power amplification stage before an analog-to-digital (ADC) section. The prior CE uses a variable gain amplifier which represents a tradeoff between gain and IP3, a non-desirable situation when detecting OFDM waveforms.
13. The transmitter (Tx) chain on the card 34 is more isolated overall from the Rx chain. In the prior CE, components and stages had to be shared in order to allow the radio to be packaged and mounted within the specified space. Additional isolation is also obtained by physically separating the two converter chips 10 which function as first and second IF stage mixers on the card 34. And since the size of each chip package may be as small as 3 mm×3 mm, component sharing is not necessary and more isolation between the Tx and the Rx chains is achieved.

FIGS. 4 and 5 are schematic diagrams of the RF circuit card 34 showing the chips 10 employed as first and second IF stage converters. Examples 1 and 2, below, describe the operation of the card 34 including the chips 10 and other components when the CE is tuned to an RF input signal 42 of, e.g., 1.7 GHz (FIG. 4), and 5.9 GHz (FIG. 5). In addition to the chips 10, other features that allow the receive frequency range to be extended are separately packaged, commercial off the shelf (COTS) components such as RF switches and surface acoustic wave (SAW) RF bandpass filters. The transmit frequency range is extended to 6 GHz by the use of separate GaN RF pre-amplifier and final amplifier gain stages.

EXAMPLE ONE

FIG. 4

Operation of Rx Chain to Receive and Down Convert a 1.7 GHz RF Signal

FIG. 4 is a schematic block diagram of the inventive RF circuit card 34, illustrating the operation of a Rx chain 40 in the card when an associated CE module or transceiver is tuned to receive a RF signal 42 at a frequency of 1.7 GHz.

A field programmable gate array (FPGA) in the transceiver is configured to accept a command for tuning the receiver to a desired frequency, for example, 1.7 GHz. A 1 to 2 GHz filter table is accessed, the appropriate 1000-2000 MHz front end (FE) filter 44 is selected from among a stack 45 of, e.g., five SAW filters, and the filter 44 is switched into the Rx chain 40 by a pair of electronically controlled switches shown in FIG. 4. A control value that tunes the filter 44 to 1.7 GHz is recalled, and the value is applied to a tuning port of the FE filter 44 by a DAC.

A high IP3 low noise amplifier (LNA) 46 appropriate for the desired frequency of 1.7 GHz, is selected from among a bank of two LNAs and the amplifier 46 is switched into the Rx chain 40. A first one of the chips 10 functions as a first IF conversion stage 48, and the chip receives a word via its SPI 18 corresponding to a nominal receive AGC level for tuning each of the internal attenuators 16, 17, over a 30 dB range. The initial AGC value is based on an estimate of the SNR made at back end processing stages of the receiver, and is written in a calibration table that is preferably stored in a ferromagnetic RAM (FRAM) of the receiver.

A fractional synthesizer 50 is configured to produce a first local oscillator signal to drive the mixer 12 in the first conversion stage chip 10. A preferred synthesizer 50 is type ADC 4350 available from Analog Devices, or equivalent. The synthesizer 50 is tuned to produce the first LO signal at a frequency equal to a first intermediate frequency (IF) specified for the transceiver (e.g., 455 MHz) plus the frequency of the RF signal 42 to be received, i.e., 455+1700=2155 MHz. A 225-500 MHz image reject filter 52 is switch-selected from a stack 53 of two SAW filters following the first conversion stage 48. The filter 52 is then tuned to the specified first IF signal frequency of 455 MHz, thus allowing the down converted RF signal 42 to pass while rejecting all undesired sidebands.

The output of the filter 52 is operatively connected through a switch to an input of a second chip 10 that functions as a second IF conversion stage 60. A fractional synthesizer 62 (e.g., type ADC 4350) is configured to produce a second LO signal for driving the mixer 12 in the second chip 10 at such a frequency so that the difference between the first IF of 455 MHz and the frequency of the second LO signal is equal to a second IF (e.g., 70 MHz) specified for the transceiver. The built in 30 dB attenuators 16, 17, of the second chip 10 are then tuned to a precalibrated AGC value to produce a particular SNR for a detected baseband waveform.

After the second IF conversion stage 60, an appropriate bandwidth (BW) filter that is centered at the second IF frequency of 70 MHz, is selected from among a stack 70 of SAW filters. The stack 70 may include, e.g., four filters having bandwidths of 25 KHz, 1.2 MHz, 5 MHz, and 30 MHz. The filter selection is made in response to a control command from a waveform FPGA in the transceiver, and corresponds to the bandwidth of a particular waveform to be detected from the downconverted RF signal 42. Following the filter stack 70, a single ended to differential high IP3 gain stage 80 operates to amplify the BW filtered IF signal, and to buffer the signal before it is applied to an ADC 90 for further processing at the back end of the transceiver.

EXAMPLE TWO

FIG. 5

Operation of Rx Chain to Receive and Down Convert a 5.9 GHz RF Signal

When the transceiver FPGA accepts a command to tune the radio to 5.9 GHz, a 4-6 GHz stripline tunable filter table is accessed, an appropriate 4 GHz-6 GHz FE filter 92 is selected, and a DAC control value that is operative to tune the filter 92 to 5.9 GHz is recalled. The control value is applied to the tuning port of the FE filter 92, and a proper LNA 96 for the operating frequency is switch selected.

The chip 10 of the first conversion stage 48 is given a word via its SPI 18 corresponding to a nominal receive AGC level for tuning each of the internal attenuators 16, 17, over a 30 dB range. The initial AGC value is based on an estimate of the SNR at the back end processing of the transceiver and may be part of a calibration table stored in the FRAM of the receiver. The fractional synthesizer 50 of the first conversion stage 48 is tuned to output a LO signal at a frequency of the first IF (455 MHZ) plus the frequency of the desired RF signal (5900 MHZ), or 6355 MHZ. The 225-500 MHZ image reject filter 52 that follows the first conversion stage 48 is then tuned to the first IF of 455 MHZ, thus allowing the down converted RF signal 42 to pass while rejecting all undesired sidebands.

The output of the filter 52 is applied through a switch to an input of the second chip 10 that functions as the second IF conversion stage 60. The synthesizer 62 is tuned to output a LO signal to the mixer in the chip 10 at such a frequency so that the difference between the first IF of 455 MHz and the frequency of the second LO signal is equal to the second IF (e.g., 70 MHz) specified for the transceiver. The built in 30 dB attenuators 16, 17, of the second chip 10 are then tuned to a precalibrated AGC value to produce a particular SNR for a detected baseband waveform.

As in Example One, after the second IF conversion stage 60, an appropriate bandwidth (BW) filter centered at the second IF frequency of 70 MHz is selected from among the stack 70 of SAW filters whose bandwidths may include, e.g., 25 KHz, 1.2 MHz, 5 MHz, and 30 MHz. The filter selection is made in response to a control command from a waveform FPGA in the transceiver, and corresponds to the bandwidth of the particular waveform to be detected from the RF signal 42. Following the filter stack 70, the single ended to differential high IP3 gain stage 80 amplifies the BW filtered IF signal, and buffers the signal before it enters to an ADC 90 for further processing.

Those skilled in the art will appreciate that the provision of the two IC converter chips 10 with integrated amplifiers, mixers, and attenuators in the Rx chain of a transceiver, together with the application of GaN technology in the transmit chain, can extend the upper operating frequency of the radio as high as 6 GHz and thus support important new and emerging wideband networking waveforms.

While the foregoing represents preferred embodiments of the invention, those skilled in the art will understand that various changes, modifications, and additions may be made without departing from the spirit and scope of the invention, and that the present invention includes all such changes and modifications as are within the scope of the following claims.

I claim:

1. A communications radio or transceiver having an extended upper operating frequency limit, comprising:
a first intermediate frequency (IF) conversion stage constructed and arranged for receiving and converting a radio frequency (RF) input signal to a first IF signal;
a second IF conversion stage constructed and arranged for converting the first IF signal to a second IF signal;
wherein each of the first and the second conversion stages includes:
an adjustable first attenuator for receiving an input radio frequency (RF) signal,
an amplifier coupled to an output of the first attenuator,
an adjustable second attenuator coupled to an output of the amplifier,
a serial peripheral interface (SPI) arranged for adjusting the first and the second attenuators in response to SPI command words,
a mixer coupled to an output of the second attenuator, and
a buffer for applying a local oscillator (LO) signal that is supplied to the buffer, to an input of the mixer;
a radio frequency (RF) synthesizer constructed and arranged for supplying the LO signal to the buffer in each of the conversion stages, wherein the LO signal supplied to each buffer is nominally −15 dBm; and
wherein (i) each of the conversion stages is in the form of an integrated circuit chip, (ii) components of each of the conversion stages and electrical connections between the components of each conversion stage are dimensioned so that each chip has an upper operating frequency limit of at least 6 GHz, and (iii) the chips are separated from one another for achieving a desired isolation but are of sufficiently small size to enable the radio to be packaged in a relatively small space.

2. The communications radio according to claim 1, wherein the dimensions of each chip are about 3 mm by 3 mm.

3. The communications radio according to claim 1, including a first IF filter coupled between an output of the first conversion stage and an input of the second conversion stage.

4. The communications radio according to claim 1, including a stack of tunable front end (FE) filters each having a different tuning range, and switches for placing a selected one of the FE filters into a receive chain at a front end of the radio.

5. The communications radio according to claim 1, wherein the mixer is a Gilbert cell mixer.

6. The communications radio according to claim 1, wherein the amplifier is a transimpedance amplifier (TIA).

7. The communications radio according to claim 1, wherein the first and the second attenuators of each of the conversion stages are adjustable in steps over a 30 dB range of attenuation.

8. The communications radio according to claim 7, wherein the attenuation steps are approximately 0.125 dB in size.

\* \* \* \* \*